United States Patent Office 3,084,196
Patented Apr. 2, 1963

---

3,084,196
PROCESS FOR PREPARING PARA-t-ALKYL THIO-
PHENOLS USING $AlCl_3$, $AlBr_3$, $AlI_3$, AND $ZrCl_4$
AS CATALYSTS
Robert J. Laufer, Pittsburgh, Pa., assignor to Consolidation Coal Company, Pittsburgh, Pa., a corporation of Pennsylvania
No Drawing. Filed Nov. 21, 1960, Ser. No. 70,405
21 Claims. (Cl. 260—609)

This invention relates to t-alkylated thiophenols and processes for preparing them. More particularly, it relates to a process whereby para-t-alkyl thiophenols are prepared by direct alkylation of a thiophenol in the presence of aluminum chloride, aluminum bromide, aluminum iodide, or zirconium tetrachloride as catalyst. This invention further relates to the preparation of t-alkyl aryl sulfides and their conversion to para-t-alkyl thiophenols in the presence of these catalysts.

The problems involved in the direct alkylation of thiophenols are well known. As has been pointed out in U.S. Patent 2,753,378:

"In contrast with phenolic compounds, which are simply alkylated to produce alkyl phenols, previous efforts to alkylate thiophenols have resulted in alkylation exclusively of the sulfur atom with the resulting production of aryl alkyl sulfides. Since efforts to effect carbon alkylation of thiophenols in the past have resulted in the production of aryl alkyl sulfides, it has been necessary to resort to means such as zinc dust reduction of alkyl benzene sulfonyl chlorides, the reaction of diazotized alkaryl amines with hydrogen sulfide, catalytic hydrogenation of aryl sulfonic acids and the action of sulfur on Grignard reagents in order to produce alkyl-substituted thiophenols. In addition to the tendency towards thioether formation, attempted alkylation of thiophenols has also been complicated by the fact that common alkylating catalysts such as anhydrous aluminum chloride and concentrated sulfuric acids have tended to cause desulfurization and condensed ring formation at relatively mild operating conditions."

It has been reported in the prior art that thiophenols, including ortho- and meta-substituted alkyl thiophenols, can be directly alkylated in the para position by using a combination of a specific alkylating agent, namely, either a tertiary aliphatic alcohol or a tertiary aliphatic mercaptan, together with a specific catalyst, namely, an aluminum halide catalyst, e.g., aluminum chloride. Primary and secondary alcohols are considered unsuitable as alkylating agents in that sulfur-alkylated products are reported to be produced exclusively. In this method of the prior art using the specified t-alkylating agents, the ring-alkylated, i.e., C-alkylate product, is reported as being formed in a yield that is low compared with yields obtained by the process of this invention, with relatively large amounts of the sulfide, i.e., S-alkylate product, being formed. Further, the specific alkylating agent required with the process, i.e., the tertiary alcohol or tertiary mercaptan, is relatively more expensive than olefinic alkylating agents. In addition, relatively large amounts of the catalyst are required. Since an additional hydrolysis step is needed for recovery of the C-alkylate compound, the catalyst will ordinarily be consumed in the reaction or otherwise not recoverable.

It is accordingly an object of the present invention to provide a method, free from the disadvantages of known methods, for directly t-alkylating a thiophenol in the para position of the ring.

It is a further object to provide a method for t-alkylating a thiophenol to a C-alkylated thiophenol substantially free from S-alkylated products.

It is still a further object to provide a method for converting t-alkyl aryl sulfides to ring-alkylated thiophenols.

It is an additional object to provide t-alkylated thiophenols in high yield.

In accordance with this invention, an alkylatable thiophenol containing meta and para positions that are "free," i.e., unsubstituted by other than a hydrogen atom, is converted to a para-t-alkyl thiophenol in substantial yield by reacting it with a t-alkyl-generating monoolefinic alkylating agent under suitable ring alkylating conditions in the presence of a catalyst selected from the class consisting of anhydrous aluminum chloride, aluminum bromide, aluminum iodide, and zirconium tetrachloride so that there occurs substantial substitution by the tertiary alkyl group in the para position. To establish suitable ring alkylating conditions, it is essential to avoid substantial degradation of the thiophenol, e.g., formation of desulfurization and self-condensation products. These degradation reactions will occur if the catalyst is allowed to remain in contact with only the thiophenol at above room temperature. However, it has now unexpectedly been discovered that degradation of the thiophenol can be effectively minimized if olefin or its sulfide equivalent is present in the reaction mixture. Under this condition, the catalyst preferentially acts to promote the ring-alkylation reaction and does not degrade the thiophenol.

The olefin used in the practice of this invention has one double bond per molecule and generates a tertiary alkyl substituent. Preferred olefinic alkylating agents are those which additionally contain from 4 to 12 carbon atoms.

Further in accordance with this invention, any S-alkylate products formed during the alkylation reaction, e.g., sulfides, may be disproportionated or rearranged to form t-alkyl-substituted C-alkylate product by further reaction of the S-alkylate product in the presence of the selected catalyst. Optionally, additional quantities of the starting thiophenol may be added. By either technique, all S-alkylate product may be converted to C-alkylate product. Effectively, then, the S-alkylate compound acts as an alkylating agent, either ring alkylating some of the added thiophenol or another sulfide molecule. At the same time, the S-alkylate product may undergo internal rearrangement to a C-alkylate product.

The terms "alkylation" or "alkylating" as used herein, unless otherwise indicated, are directed to the substitution of a tertiary alkyl hydrocarbon radical for a hydrogen atom in the para position of a thiophenolic compound. The term "C-alkylation" is specific to substitution in the ring, and "S-alkylation" refers to substitution of the hydrogen atom attached to the sulfur atom to form an alkyl aryl sulfide.

The alkylatable thiophenolic compounds that are employed as starting materials in the process of this invention contain hydrogen atoms in the meta positions in addition to containing a hydrogen atom in the para position with respect to the sulfhydryl or thiol group present on the benzene nucleus. Problems of steric hindrance will ordinarily occur when an attempt is made to substitute a group onto the ring in a position adjacent to another group already on the ring. Thus the presence of a methyl or other alkyl group in a meta position will prevent para-alkylation from occurring even though the para position is free, i.e. unsubstituted by other than hydrogen. Thiophenol homologs that may be advantageously employed in the process of this invention include, for example, o-thiocresol, o-ethylthiophenol, 2,6-thioxylenol, o - n - butylthiophenol, 2,6-diisopropylthiophenol, o-n-hexylthiophenol, and o-chlorthiophenol. In general, thiophenol itself and thiophenol substituted only by lower alkyl radicals ($C_1$ to $C_5$) are preferred as alkylatable starting materials. These preferred alkylatable thiophenols are unsubstituted by other than hydrogen in the 3, 4, and 5 positions on the ring.

In general, t-alkyl-generating unsaturated aliphatic hydrocarbons having from 4 to 12 carbon atoms, e.g., various olefins and olefin polymers, are suitable and preferred for the practice of this invention. Particularly useful are terminal olefins of the type $R_1R_2C=CH_2$ where $R_1$ and $R_2$ are alkyl, especially where $R_1$ or $R_2$ is methyl or where $R_1$ and $R_2$ form a five- or six-membered ring. As the molecular weight of the olefin employed increases, yields of ring-alkylated product decrease. Also, when olefins of higher molecular weight are used, separation between the isomeric thiophenols and sulfides that are formed becomes more difficult because of the close and frequently overlapping boiling ranges of these products. Suitable t-alkyl-generating olefinic alkylating agents that may be used for obtaining substitution in the para position of the ring include isobutylene, isoamylene, propylene, trimer, and propylene tetramer.

It is considered an essential feature of this invention that anhydrous aluminum chloride, aluminum bromide, aluminum iodide, or zirconium tetrachloride be used as catalyst together with a t-alkyl-generating olefin under suitable alkylating conditions to effect the direct ring-alkylation reaction in the para position and also to effect the conversion of S-alkylate product to C-alkylate product. As mentioned, these suitable alkylating conditions require the concurrent presence of the olefin or sulfide equivalent in the reaction mixture in order to effectively minimize degradation of the thiophenol. Aluminum chloride is particularly preferred as alkylation catalyst because of its ready availability and high activity at relatively low concentrations by weight. Because of their higher molecular weights, greater concentrations by weight of aluminum bromide, aluminum iodide and zirconium tetrachloride are required to obtain the same molar concentration of catalyst as for aluminum chloride.

It should be noted that while other so-called Friedel-Crafts or acid-type catalysts such as zinc chloride, antimony trichloride, antimony pentachloride, titanium tetrachloride, sulfuric acid, phosphoric acid, aluminum chloride sulfate.

$(AlCl_2HSO_4)$ and ferric chloride, as well as the four catalysts used in the practice of this invention are extremely effective for ring-alkylating phenols, using catalyst concentrations as low as 0.2 percent by weight, these aforementioned other catalysts are essentially ineffective for the ring alkylation of thiophenols or for converting S-alkylate compounds to C-alkylate ones. Thus for alkylation of thiophenols, so-called conventional alkylation catalysts are not substitutive for each other.

Temperatures between about 50 and 120° C. may be successfully employed in the practice of this invention. For obtaining substantial ring alkylation a temperature between about 75 and 100° C. is preferred. At temperatures below 75° C. the rate of C-alkylation becomes too slow, with S-alkylation predominating. At temperatures below 50° C., sulfide alklation tends to become essentially exclusive. As the temperature is raised above 100° C., sulfide formation and thiophenol polymerization deleteriously affect the yield of ring-alkylated product. An amount of 5 to 10 percent of catalyst, based on the original weight of the thiophenol, is generally preferred for obtaining optimum yields. However, amounts of catalyst between 3 and 25 percent by weight are considered suitable depending upon specific reaction conditions.

As noted, at temperatures below 75° C., sulfide formation tends to predominate, and at temperatures above 100° C., undesirable side reactions become increasingly important. However, for obtaining substantial ring alkylation of the thiophenol at optimum alkylation temperatures between about 75 and 100° C., it has been found, surprisingly, that olefin or sulfide must be present in substantial amount to prevent degradation of the thiophenol by the catalyst. For most reactions, at least 0.7 mole of olefin or sulfide equivalent is required to be present per mole of thiophenol to suppress degradation. If alkyl aryl sulfide or alkyl thiophenol is not present in sufficient amount at reaction temperature, then marked degradation of the thiophenol occurs, and extremely low yields of alkylated thiophenol result. As a preferred technique for obtaining substantial ring alkylation and for minimizing the degradation of the thiophenol being alkylated, it is desirable to add the required amount of olefin or sulfide rapidly at relatively low temperatures. External cooling of the system is usually preferred because of the highly exothermic nature of the alkylation reaction. This low-temperature rapid addition technique conveniently provides a stabilized admixture with minimal degradation of thiophenol.

Of the catalysts suitable for the practice of this invention, aluminum chloride is preferred, and its degradation reactions with thiophenols have been investigated most extensively. It has been found that aluminum chloride dissolves readily in thiophenol and thiocresols at room temperature to yield a clear, red-colored solution. In all likelihood, the mechanism of this solution process involves complex formation with the thiophenol. While thiophenol and thiocresols containing aluminum chloride undergo degradation reactions somewhat slowly at 25° C., these reactions are extremely rapid at 80° C., which is within the optimum temperature range for the ring alkylation reaction. Thus after 3 hours at 80° C. thiophenol is 94 percent converted to diphenyl sulfide, thianthrene, benzene, and hydrogen sulfide. Under similar conditions, mixed thiocresols are converted even more readily to toluene, ditolyl polysulfides, elemental sulfur, and hydrogen sulfide.

Where mixed thiocresols are t-butylated, the degradation reaction proceeds to the virtual exclusion of the desired alkylation reaction unless at least 0.75 mole of isobutylene or sulfide equivalent per mole of thiocresols is present in the reaction mixture. Thus if a mixture of t-butyl tolyl sulfides is used as butylating agent—this is equivalent to equimolar amounts of isobutylene and thiocresols—then the desired nuclear butylation proceeds with practically no degradation of the thiophenol by the aluminum chloride. Thus I have discovered that thiophenols may be successfully ring alkylated, with almost complete disappearance of these degradation side reactions, if adequate amounts of t-alkyl groups are present. It is believed that this peculiar phenomenon may reflect a modification of the properties of the catalyst by its complexing either with an alkylated thiophenol or possibly with the olefin itself. Whatever the explanation, I have now provided a method for directly ring alkylating thiophenols in high yield at low catalyst concentrations. Within the framework of this invention, this is preferably and most conveniently accomplished by rapidly adding sufficient olefin at a low temperature, namely below that at which degradation occurs, and then completing the alkylation reaction at an optimum temperature. These factors appear to be more critical in the alkylation of thiocresols using aluminum chloride as catalyst.

Since the initial reaction of the olefin with a thiophenol is rapid and highly exothermic (yielding either the alkyl aryl sulfide, ring-alkylated products, or both, depending upon the temperature), for rapid charging of the olefin to the system while maintaining a relatively low temperature, it is desirable that the reactor be equipped with adequate cooling facilities. After the olefin has been charged, external heating may then be employed to maintain the desired reaction temperature.

The process disclosed herein is particularly advantageous for commercial exploitation inasmuch as the alkylated thiophenol may be completely converted to the para-C-alkylate product with no S-alkylate product present. Thus when an alkylatable thiophenol containing hydrogen atoms in meta and para positions is alkylated in accordance with this invention, para C-alkylate and S-alkylate products are formed. Means have now been provided, without basically changing the reactants or catalyst system employed, for further converting the S-alkylate products to the para C-alkylate products. This is accomplished by reacting the sulfides per se, or with additional portions of the starting thiophenol, in the presence of aluminum chloride, aluminum bromide, aluminum iodide, or zirconium tetrachloride as catalyst. Furthermore, where t-alkyl aryl sulfides are used as starting materials, independent of how produced, means have now been provided for converting them to ring-alkylated thiophenols while simultaneously using them as ring-alkylating agents for sulfides or thiophenols present. The alkyl group must be a t-alkyl group in order to be directed to the para position.

In general, in the direct alkylation step, using an olefin rather than an alkyl aryl sulfide as alkylating agent, if less than a mole of alkylating agent per mole of alkylatable thiophenol is used, increased formation of the C-alkylate product is favored. A molar ratio of 0.75 to 1 of alkylating agent to thiophenol is preferred for this purpose, a ratio of 0.80 being considered optimal. If the ratio falls below 0.75, degradation of certain thiophenols may be markedly increased. If the ratio rises above 1, i.e., above equimolar quantities of the reactants, formation of alkyl alkaryl sulfide may be promoted at the expense of the alkyl thiophenol. In addition, the use of large excesses of olefin and long reaction times does not usually give improved conversion, but rather leads to undesired side reactions such as the formation of high-boiling materials, possibly derived from olefin polymers.

The S-alkylate product generally consists of the t-alkyl aryl sulfide and also of the t-alkyl p-t-alkaryl sulfide. The formation of the latter sulfide is favored when a molar excess of alkylating agent is used. The conversion of the sulfides may be carried out at atmospheric pressure or at greater than atmospheric pressure and at a temperature between about 50 and 120° C. A temperature between about 75 and 100° C. is considered optimal. The catalyst present may vary from 3 to 25 percent by weight of the thiophenol added. Amounts from 5 to 10 percent are preferred.

Without being restricted by the reaction mechanism to be suggested, it is believed that reaction of the t-alkyl aryl sulfide under alkylating conditions primarily results in the isomerization of the sulfide both on an inter- and intramolecular basis. That is, the t-alkyl group attached to the sulfur atom may migrate to the para position of its own molecule, where this position is free, and also to that of another reactant molecule thereby forming a C-alkylate derivative.

Although thiophenol may be added to the alkyl aryl sulfide, the isomerization can occur wholly independent of the amount of any added thiophenol (Reaction 2). However, reaction of a t-alkyl p-t-alkaryl sulfide under alkylation conditions requires addition of a thiophenol to yield p-t-alkyl thiophenol (Reaction 3) inasmuch as the extra t-alkyl group requires an acceptor. Of course in actual practice both Reactions 2 and 3 will occur simultaneously. The extra S-t-alkyl group may also be removed by selective cleavage techniques.

In reactions involving the isomerization of a preformed t-alkyl aryl sulfide, best results are obtained by heating the pure sulfide with the catalyst in the absence of any added thiophenol. These conditions correspond to an olefin to thiophenol ratio of unity. In the disproportionation of t-alkyl p-t-alkaryl sulfides, equimolar quantities of the sulfide and of the unalkylated thiophenol are considered to yield optimum results.

In general, the assumption is made that one mole of a t-alkyl sulfide in the reaction mixture is equivalent to one mole of the corresponding olefin since the tertiary alkyl aryl sulfides function as nuclear alkylating agents. Mechanistically, they may be formed as major intermediates in the direct olefin t-alkylation of thiophenols.

Depending upon specific reaction conditions with respect to temperature, olefin and thiophenol, a reaction time of as little as half an hour may be employed. In general, reaction times between 2 and 3 hours are preferred. Under optimum conditions of temperature and of catalyst concentration, as well as optimum olefin to thiophenol ratio, an increase in the reaction time beyond 3 to 6 hours (after addition of the olefin and after attainment of selected reaction temperature), will ordinarily give little increase in the yield of the t-alkyl thiophenol at the expense of the by-product sulfides. In general, the products approach an equilibrium distribution after 3 hours at 80° C.

Thiophenol and o-alkyl-substituted thiophenols may be directly alkylated in the para position of the ring in accordance with this invention using a t-alkyl-generating olefin or a t-alkyl aryl sulfide as alkylating agent. Where the para position of the thiophenol is substituted, no t-alkylation has been found to occur anywhere on the ring even where the ortho and meta positions are free. For example, when a mixture of the three isomeric thiocresols was reacted with isobutylene in the presence of 6 percent by weight of aluminum chloride, based on the thiocresols, almost complete conversion of the o-thiocresol was obtained, with about half of the converted material being t-butyl-o-thiocresol. By contrast, the meta- and para-thiocresols are recovered unreacted or as their t-butyl sulfides. No ring alkylation occurs.

The alkylated thiophenols, both C-alkylated and S-alkylated, find a variety of uses. Several of these compounds or their metallic salts are of interest as lubricating oil additives because of their antioxidant and detergent properties. As antioxidants, they serve to prevent resin formation in fuels; condensed to form thioacetals, they are particularly suited as additives for high-pressure lubricating oils; they are also useful as additives for metal cleaners to protect the metal from atmospheric attack; they also protect drying oils, such as linseed oil, from darkening and oxidation; they have also been used to stabilize preparations of adrenalin and other hormones. Various of the S-alkylate compounds, e.g., t-butyl p-t-butylphenyl sulfide, nonyl phenyl sulfide, and nonyl p-nonylphenyl sulfide, are seen as possessing useful insecticidal properties in addition to being useful as ready sources for the production of the corresponding thiophenols.

In addition, compounds such as the p-t-butylthiophenols are particularly useful as substantially odorless rubber peptizers. Thus, while o-thiocresol possesses peptizing properties, compounds such as 4-t-butyl-o-thiocresol and 4-t-butyl-2,6-thioxylenol may be used as rubber peptizers, and at the same time are free from the sickeningly repugnant odor characterizing o-thiocresol. A higher molecular weight compound such as p-nonylthiophenol is seen as affording similar peptizing advantages in this regard. The metal salt or phosphate ester of p-nonylthiophenol is considered suitable as an antioxidant lubricating oil additive.

The process of this invention is advantageously employed to prepare para-t-butyl thiophenols directly from thiophenol or its homologs. Typical C-alkylate and S-alkylate products that may be formed by direct butylation of thiophenol are the following:

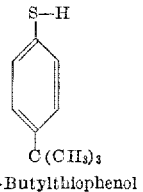

p-t-Butylthiophenol

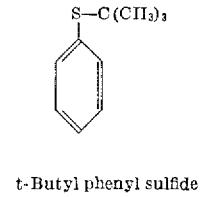

t-Butyl phenyl sulfide

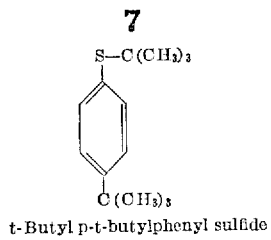

t-Butyl p-t-butylphenyl sulfide

For purposes of illustration, without limiting the scope of this invention, the process of the invention will be particularly described with reference to the conversion of thiophenol and o-thiocresol to p-t-butylthiophenol and p-t-butyl-o-thiocresol, respectively. The following reactions, shown schematically and not stoichiometrically, illustrate the manner in which conversion of thiophenol to p-t-butylthiophenol may be obtained.

REACTION 1.—DIRECT t-BUTYLATION OF THIOPHENOL

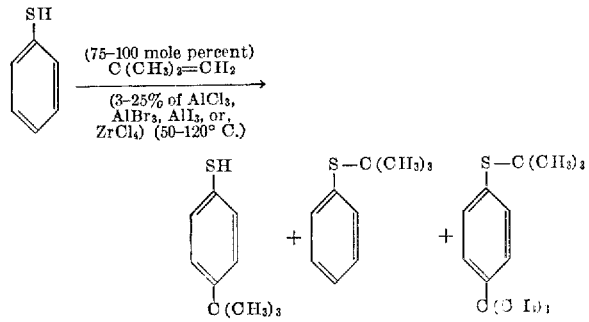

REACTION 2.—ISOMERIZATION OF t-BUTYL PHENYL SULFIDE

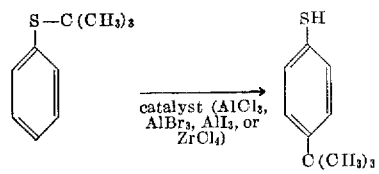

REACTION 3.—DISPROPORTIONATION OF t-BUTYL p-t-BUTYLPHENYL SULFIDE

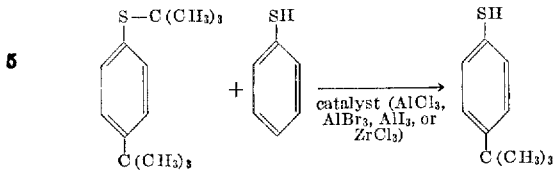

It is noted that in accordance with the above three reactions, the final product obtained is either p-t-butylthiophenol or convertible thereto. Thereby complete conversion of thiophenol to p-t-butylthiophenol may be obtained if degradation of the thiophenol can be avoided.

*Example 1.—Reaction of Isobutylene With Thiophenol ($AlCl_3$, $AlBr_3$, and $ZrCl_4$ Catalysts)*

For the eight runs reported in Table I, a stainless steel reaction vessel fitted with a mechanical stirrer and provided with cooling and heating facilities was used. The anhydrous thiophenol and the alkylation catalyst were charged to the reactor under a dry nitrogen blanket at room temperature or below. A short period of stirring served to dissolve the catalyst. The isobutylene, which is the most volatile olefin of those suitable for this reaction, was added at a pressure below 50 p.s.i.g. and as rapidly as control of temperature would permit. For the eight runs illustrated, aside from choice of catalyst the principal variation in the runs was with respect to the time and temperature of isobutylene addition and time and temperature for completing the reaction. As may be noted from Table I, optimum ring alkylation is obtained at a temperature between 75 and 100° C. At room temperature, S-alkylation is substantially exclusive.

TABLE I.—BUTYLATION OF THIOPHENOL ($AlCl_3$, $AlBr_3$, AND $ZrCl_4$ AS CATALYSTS)

Conditions for Runs 1–8:
  Thiophenol charged: 550 grams (5 moles)
  Isobutylene charged: 224 grams (4 moles)
  Molar ratio isobutylene to thiophenol: 0.8
Catalysts:
  Anhydrous $AlCl_3$ (Runs 1–6): 0.25 mole (33 grams; 6% by weight thiophenol)
  Anhydrous $AlBr_3$ (Run 7): 0.25 mole (66 grams; 12% by weight thiophenol)
  Anhydrous $ZrCl_4$ (Run 8): 0.25 mole (58 grams; 10.5% by weight thiophenol)

| Run No. | Catalyst | Isobutylene addition | | Reaction conditions | | Thiophenol converted (percent by weight) | Product yield (mole percent based on converted thiophenol) | | |
|---|---|---|---|---|---|---|---|---|---|
| | | Temp. (° C.) | Time (hours) | Temp. (° C.) | Time (hours) | | p-t-Butyl thiophenol | t-Butyl phenyl sulfide | t-Butyl p-t-butyl phenyl sulfide |
| 1 | $AlCl_3$ | 15–26 | 0.9 | 20 | 4.5 | 76 | Nil | 98 | Trace |
| 2 | $AlCl_3$ | 50–60 | 0.4 | 50 | 5 | 60 | 24 | 47 | 26 |
| 3 | $AlCl_3$ | 15–105 | 0.07 | 75 | 3 | 72 | 69 | 9.0 | 17 |
| 4 | $AlCl_3$ | 19–81 | 0.05 | 80 | 6.5 | 70 | 73 | 8.3 | 14 |
| 5 | $AlCl_3$ | 20–100 | 0.07 | 100 | 3 | 74 | 68 | 6.3 | 16 |
| 6 | $AlCl_3$ | 25–135 | 0.13 | 150 | 3 | 56 | 62 | 5.7 | 0.5 |
| 7 | $AlBr_3$ | 25–80 | 0.2 | 80–85 | 3 | 72 | 74 | 8 | 15 |
| 8 | $ZrCl_4$ | 22–50 | 0.4 | 80 | 5 | 72 | 72 | 5 | 12 |

*Example 2.—Degradation of Thiophenol and Thiocresol by Aluminum Chloride in the Absence of Olefin or Sulfide*

To a 2-liter autoclave at 28° C. was added 330 grams thiophenol (3 moles) and 20 grams aluminum chloride. The temperature was raised to 84° C. over a period of 1 hour and 13 minutes, and maintained at 78–84° C. for 3 hours. A pressure of 118 p.s.i.g. was developed, principally because of evolved $H_2S$. Substantially complete degradation of the thiophenol occurred, 93.5 percent being converted. Of the converted product, diphenyl sulfide was obtained in 48 percent yield, thianthrene in 16.3 percent yield, benzene in 11.6 percent yield. The balance consisting of hydrogen sulfide gas and miscellaneous residue.

Mixed thiocresols (37.5 percent ortho, 48 percent meta, and 14.5 percent para) were reacted with 5 percent by weight of aluminum chloride at a temperature between 70 and 80° C. for 3.5 hours. No olefin or sulfide was added. The thiocresols were completely destroyed, toluene being recovered in 56 percent yield. Elemental sulfur and considerable quantities of $H_2S$ were also formed.

Example 3.—Attempted C-Butylation of Thiophenol Using Other Catalysts

The thiophenol was reacted with isobutylene under substantially the same conditions as reported for Example 1, except that catalysts other than those of this invention were used for the reaction. In all instances the principal product formed was the butyl phenyl sulfide, with either no ring alkylation or insignificant ring alkylation occurring. The results are shown in Table II.

the temperature was maintained between 25 and 60° C. The reaction was then completed at a temperature between 70 and 86° C. for a period of one hour. The thiophenol was almost completely converted, a yield of 14 mole percent of 4-t-butyl-2,6-diisopropylthiophenol being obtained. No butyl sulfide was obtained. The other products isolated were those resulting from desulfurization and were identified as m-diisopropylbenzene and 1,3-diisopropyl-5-t-butylbenzene.

Example 6.—Reaction of Metathiocresol With Isobutylene

Equimolar amounts of metathiocresol and isobutylene were reacted in the presence of 5 percent by weight of aluminum chloride (based on thiol). The isobutylene was added at a temperature between 26 and 81° C. over a period of 1.7 hours. The reaction was completed at 80° C. for 4 hours. Eighty-seven percent of the thiocresol was converted. Of the converted material, 72 percent was recovered as t-butyl-m-tolyl sulfide. No ring alkylation was found to occur in any of the remaining para, meta, or ortho positions open on the ring. Thus the presence of a methyl group in the meta position,

TABLE II.—BUTYLATION OF THIOPHENOL (MISCELLANEOUS CATALYSTS)

[Amounts of thiophenol and isobutylene charged were as in Table I]

| Run No. | Catalyst | Concn. of catalyst | | Isobutylene addition | | Reaction conditions | | Thiophenol converted (percent by weight) | Product yield (mole percent based on converted thiophenol) | | |
|---|---|---|---|---|---|---|---|---|---|---|---|
| | | Moles | Percent by weight thiophenol | Temp. (°C.) | Time (hours) | Temp. (°C.) | Time (hours) | | p-t-Butyl-thiophenol | t-Butyl phenyl sulfide | t-Butyl p-t-butyl-phenyl sulfide |
| 9 | FeCl₃ | 0.50 | 16.4 | 25–90 | 0.2 | 80 | 4 | 82 | Nil | 79 | 6 |
| 10 | ZnCl₂ | 0.42 | 10.4 | 25–85 | 1.9 | 75–85 | 5.5 | 76 | 6 | 87 | 0.6 |
| 11 | SbCl₃ | 0.20 | 10.4 | 32–38 | 0.1 | { 80 / 80–100 } | { 3 / 0.25 } | 6 | Nil | 56 | Nil |
| 12 | 85% H₃PO₄ | 0.25 | 5.3 | 19–80 | 2 | 80 | 5 | 44 | 0.3 | 90 | Trace |
| 13 | 98% H₂SO₄ | 0.25 | 4.8 | 80 | 0.37 | 80 | 4.5 | 68 | Nil | 88 | Nil |

Example 4.—Higher Olefin Alkylation of Thiophenol

Several different terminal olefins were used as alkylating agents in the presence of aluminum chloride as catalyst under substantially the same alkylating conditions as reported for Example 1. The results are shown in Table III.

although a para position is open, prevents ring alkylation, the t-alkyl group attaching itself to the sulfur atom.

Example 7.—AlCl₃-Catalyzed t-Butylation of Thiocresols

Isobutylene was reacted with mixed thiocresols in the presence of aluminum chloride as catalyst. The molar TABLE III.—HIGHER OLEFIN ALKYLATION OF THIOPHENOL (AlCl₃ CATALYST)

[Four moles of olefin and 5 moles of thiophenol were charged to the reaction vessel, thereby maintaining a molar ratio of olefin to thiophenol of 0.8. For Runs 14–16, 0.25 mole of anhydrous AlCl₃ was used (33 grams; 6 percent by weight thiophenol). For Run 17, 0.56 mole of AlCl₃ was used (75 grams; 13.6 percent by weight thiophenol)]

| Run No. | Olefin | Olefin addition | | Reaction conditions | | Thiophenol converted (percent by weight) | Product yield (mole percent based on converted thiophenol) | | |
|---|---|---|---|---|---|---|---|---|---|
| | | Temp. (° C.) | Time (hours) | Temp. (° C.) | Time (hours) | | p-t-Alkyl thiophenol | Alkyl phenyl sulfide | t-Alkyl p-t-alkyl-phenyl sulfide |
| 14 | 2-methylpentene | 20–80 | 0.15 | 80 | 5.5 | 66 | 61 | 8 | 19 |
| 15 | 2-ethylbutene | 25–78 | 1.2 | 80 | 5.5 | 68 | 36 | 24 | 20 |
| 16 | 1-methylcyclohexene | 28–82 | 0.8 | 80 | 5.5 | 64 | 42 | 26 | 20 |
| 17 | 2-ethylhexene | 20–80 | 0.2 | 80 | 6 | 56 | 12 | 52 | 32 |

Example 5.—t-Butylation of 2,6-Diisopropylthiophenol (AlCl₃ Catalyst)

Equimolar amounts of 2,6-diisopropylthiophenol and isobutylene were reacted in the presence of 3.4 percent by weight of aluminum chloride (based on thiol). The isobutylene was added over a period of 12 minutes while ratio of isobutylene to total mixed thiocresols was varied. The results obtained are reported in Table IV. As may be noted, ring alkylation occurred in substantial amounts only in runs 20 and 21. Where too low or too high a ratio of isobutylene to thiocresols was employed, ring alkylation was deleteriously affected.

TABLE IV.—AlCl₃-CATALYZED t-BUTYLATION OF THIOCRESOLS

[The mixed thiocresols contained 37.5 percent ortho isomer, 48 percent meta isomer, and 14.5 percent para isomer. Catalyst concentration (percent by weight thiocresols) was 5.0% for all runs except run No. 19 (7.8%)]

| Run No. | Molar ratio [1] | Isobutylene addition | | Reaction conditions | | o-Thiocresol converted (percent by weight) | Product yield (mole percent based on corresponding thiocresol isomer converted) | | | | | |
|---|---|---|---|---|---|---|---|---|---|---|---|---|
| | | Temp. (°C.) | Time (hours) | Temp. (°C.) | Time (hours) | | t-Butyl o-thiocresol | t-Butyl o-tolyl sulfide | t-Butyl m-tolyl sulfide | t-Butyl p-tolyl sulfide | t-Butyl p-t-butyl-o-tolyl sulfide | t-Butyl toluene [2] |
| 18 | 0.42 | 25–80 | 0.2 | 80 | 5.5 | 92 | 0.8 | | 0.58 | | Nil | 24 |
| 19 | 0.57 | 20–80 | 0.08 | 80 | 12 | 98.5 | Nil | 1.6 | 5.1 | 6.2 | Nil | 37 |
| 20 | 0.76 | 30–80 | 0.6 | 80 | 5.5 | 96.5 | 47 | 0.9 | 72 | 73 | 18 | 8 |
| 21 | 0.75 | 20–64 | 1.1 | 75–80 | 12 | 97.2 | 47 | 0.4 | 74 | 86 | 13 | 8 |
| 22 | 1.47 | 18–90 | 0.45 | 75–80 | 4.5 | 94 | 8.1 | 27 | 82 | 76 | 44 | 1.5 |

[1] Isobutylene/thiocresols.  [2] Predominantly meta isomer. Yield based on total thiocresols converted.

Example 8.—Disproportionation-Isomerization of Alkyl Aryl Sulfides t-Alkyl sulfides of thiophenol and of p-t-octyl-thiophenol were reacted in the presence and in the absence of additional amounts of thiophenol using aluminum chloride as catalyst. In one run, the catalyst employed was titanium tetrachloride, which is a conventional alkylation catalyst for phenols. The results obtained are reported in Table V. In all runs but one, substantial amounts of p-alkyl thiophenol were obtained. In run 27 where titanium tetrachloride was used as catalyst, sulfide formation occurred almost exclusively. Thus by utilizing the disproportionation-isomerization reaction, thiophenol may be ring-alkylated in almost 100 percent yield by recycling sulfides formed during the alkylation. However, the selection of an appropriate catalyst is essential.

p-tolyl sulfide, 62; and t-butyl p-t-butyl-o-tolyl sulfide, 12. t-Butyl toluene (primarily the meta isomer) was obtained in 15 percent yield based on the total thiocresols converted. No ring butylated thiocresol other than t-butyl-o-thiocresol was obtained.

Example 10.—Disproportionation of t-Butyl Tolyl Sulfides in Absence of Added Thiocresols Four moles of mixed t-tolyl sulfides (35 percent ortho, 47 percent meta, and 18 percent para) were reacted with 5.3 percent by weight of aluminum chloride. Since no added thiocresols were present, equimolar amounts of isobutylene (equivalent) and thiocresol (equivalent) were present. The reaction was conducted at 80° C. for 6 hours. The conversion of t-butyl o-tolyl sulfide was 98.6 percent complete. Based on the conversion of the corresponding isomer, the following yields (mole percent)

TABLE V.—DISPROPORTIONATION-ISOMERIZATION OF ALKYL ARYL SULFIDES

| Run No. | Sulfide | Catalyst [1] | Charged | | | Reaction Conditions | | Recovered [2] | | | |
|---|---|---|---|---|---|---|---|---|---|---|---|
| | | | Thiophenol (moles) | Sulfide (moles) | Catalyst (percent by weight) | Temp. (° C.) | Time (hours) | Thiophenol (moles) | p-t-Alkyl-thiophenol (percent) | Alkyl phenyl sulfide (percent) | t-Alkyl p-t-Alkyl phenyl sulfide (percent) |
| 23 | t-Butyl phenyl | AlCl₃ | 1 | 4 | 4.3 | 80 | 3 | 1.7 | 55 | 16 | 22 |
| 24 | do | AlCl₃ | | 5 | 4.0 | 100 | 3 | 1.0 | 65 | 6 | 22 |
| 25 | do | AlCl₃ | | 5 | 5.5 | 180 | 5.5 | ³ 1.5 | 29 | 2.0 | 2.3 |
| 26 | do | TiCl₄ | | 3 | 5.8 | 82 | 6 | 0.25 | 0.03 | 93 | 5.5 |
| 27 | t-Pentyl phenyl [4] | AlCl₃ | | 2 | 4.2 | 95–104 | 3 | 0.52 | 42 | 16 | 25 |
| 28 | t-Octyl phenyl [5] | AlCl₃ | 0.25 | 1 | 4.0 | 80–85 | 6 | 0.45 | 20 | 35 | 31 |
| 29 | t-Octyl p-t-octylphenyl [6] | AlCl₃ | 0.50 | 0.5 | 6.7 | 80 | 6 | 0.26 | 18 | 34 | 38 |

[1] Based on total reactants charged.
[2] Mole percent yields calculated on the basis of thiophenol equivalents converted; e.g., one mole of t-butyl phenyl sulfide equals one mole of thiophenol and one mole of isobutylene.
[3] Isobutylene and non-distillable residues were also major products.
[4] Prepared by the reaction of thiophenol and t-pentyl alcohol in the presence of sulfuric acid.
[5] Prepared from thiophenol and octenes derived from 2-ethyl-1-hexene by dehydration.
[6] Prepared in run 17 (cf. Table III).

Example 9.—Reaction of Thiocresol With t-Butyl Tolyl Sulfide

One part of mixed thiocresols (1.25 moles) and 3 parts of mixed t-butyl tolyl sulfide (3.75 moles) were reacted in the presence of 0.25 mole of aluminum chloride as catalyst (5.3 percent by weight of thiocresols and their butyl sulfides). The distribution of isomers of both the thiocresols and their sulfides consisted of 36 percent ortho, 49 percent meta, and 15 percent para. Considering a mole of t-butyl tolyl sulfide as equivalent to a mole of thiocresol and a mole of isobutylene, the isobutylene (equivalent) to thiocresol (equivalent) molar ratio was therefore 0.75. No isobutylene per se was added to the reaction mixture. The reaction was completed at a temperature between 75 and 82° C. for 12 hours. The conversion of o-thiocresol and its t-butyl sulfide was 98.4 percent. Based on the conversion of the corresponding thiocresol isomer, the following yields were obtained (mole percent): t-butyl-o-thiocresol, 18; t-butyl o-tolyl sulfide, 0.6; t-butyl m-tolyl sulfide, 61; t-butyl were obtained: t-butyl-o-thiocresol, 44; o-thiocresol, 2.1; t-butyl m-tolyl sulfite, 92; t-butyl p-tolyl sulfide, 99; and t-butyl p-t-butyl-o-tolyl sulfide, 39. One percent of t-butyl toluene (primarily the meta isomer), based on the total thiocresols converted, was obtained. Inasmuch as no unreacted thiocresols were present, as was the case in Example 9, desulfurization was held to a minimum. It is important to note that almost half (44 percent yield based on 98.6 percent conversion) of the t-butyl o-tolyl sulfide was converted to p-t-butyl-o-thiocresol in a single stage of reaction. Thus using the direct olefinic alkylation procedure together with the disproportionation reaction for mixed thiocresols, substantially pure t-butyl-o-thiocresol may be readily recovered from the mixture by recycling formed sulfides.

The foregoing temhniques have resulted in the preparation and ready availability of many alkylated thiophenols hitherto unknown or not readily available. The physical properties of the compounds reported herein are described in Tables VI–IX.

TABLE VI.—PHYSICAL PROPERTIES OF t-ALKYL THIOPHENOLS

| R | Olefin used | t-Alkyl thiophenol | |
|---|---|---|---|
| | | Boiling point, °C./mm. Hg | Refractive index $n_D^{25}$ |
| t-Butyl | Isobutylene | 118/20 | 1.5462 |
| t-Pentyl | 2-methyl-1(2)-butene | 137/20 | 1.5455 |
| 2-methyl-2-pentyl | 2-methyl-1(2)-pentene.[1] | 145/20 | 1.5385 |
| 3-methyl-3-pentyl | 2-ethyl-1-butene [2] (3-methyl-2-pentene) | 132/10 | 1.5440 |
| 1-methyl-1-cyclohexyl | 1-methylcyclohexene | 163/10 | [3] 1.5703 |
| 3-methyl-3-heptyl | 2-ethyl-1-hexene [4] (3-methyl-2(3)-heptene) | 153/20 | 1.5332 |
| t-Nonyl | Propylene trimer | 147-150/10 | 1.5269-1.5318 |

[1] Derived from 2-methyl-1-pentanol.
[2] Derived from 2-ethyl-1-butanol.
[3] Measured on supercooled liquid. Melting point: 40° C.
[4] Derived from 2-ethyl-1-hexanol.

TABLE VII.—PHYSICAL PROPERTIES OF t-ALKYL PHENYL SULFIDES

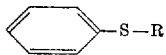

| R | Boiling point, °C./mm. Hg | Refractive index $n_D^{25}$ |
|---|---|---|
| t-Butyl | 98/20 | 1.5312 |
| t-Pentyl | 120/20 | 1.5338 |
| 2-methyl-2-pentyl | 128/20 | 1.5270 |
| 3-methyl-3-pentyl | 123/10 | |
| 1-methyl-1-cyclohexyl | 152/10 | |
| 3-methyl-3-heptyl | 158/10 | 1.5252 |
| t-Nonyl | 147-150/10 | 1.5204-1.5260 |

TABLE VIII.—PHYSICAL PROPERTIES OF t-ALKYL p-t-ALKYLPHENYL SULFIDES

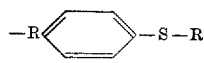

| R | Boiling point, °C./mm. Hg | Refractive index $n_D^{25}$ |
|---|---|---|
| t-Butyl | 132/10 | [1] 1.5202 |
| t-Pentyl | 160/10 | 1.5241 |
| 2-methyl-2-pentyl | 170/10 | 1.5175 |
| 3-methyl-3-pentyl | 187/10 | 1.5230 |
| 1-methyl-1-cyclohexyl | 164/.05 | 1.5583 |
| 3-methyl-3-heptyl | 145/0.3 | 1.5115 |
| t-Nonyl | 155-160/0.3 | 1.5115-1.5141 |

[1] Measured on supercooled liquid. Melting point: 49-51° C.

TABLE IX.—PHYSICAL PROPERTIES OF t-BUTYLATED ORTHO-SUBSTITUTED THIOPHENOLS

| Compound | Boiling point, °C./mm. Hg | Refractive Index $n_D^{25}$ |
|---|---|---|
| p-t-Butyl-o-thiocresol | 133/20 | 1.5460 |
| p-t-Butyl-o-isopropylthiophenol | 126/10 | 1.5313 |
| 4-t-butyl-2,6-diisopropylthiophenol | 144-147/10 | 1.5228 |
| t-Butyl o-tolyl sulfide | 115/20 | 1.5345 |
| t-Butyl p-t-butyl o-tolyl sulfide | 140/10 | 1.5250 |

Obviously, depending upon the thiophenol used and the combination of reaction parameters employed, many modifications and variations of the invention, as hereinbefore set forth, may be made without departing from the spirit and scope thereof, which are primarily directed to the direct alkylation of an alkylatable thiophenol in the para position under alkylating conditions, which include the presence of aluminum chloride, aluminum bromide, aluminum iodide, or zirconium tetrachloride as catalyst. The examples given, therefore, should be considered only illustrative of the invention, its scope being determined in accordance with the objects thereof and the appended claims.

I claim:
1. The process for preparing para-t-butyl thiophenols which comprises reacting a thiophenol containing hydrogen atoms in meta and para positions with isobutylene in the presence of a catalyst selected from the class consisting of aluminum chloride, aluminum bromide, aluminum iodide, and zirconium tetrachloride, whereby substantial carbon t-butylation in the para position occurs.

2. The process according to claim 1 wherein said catalyst is aluminum chloride.

3. The process for preparing para-t-butylthiophenol which comprises reacting thiophenol with isobutylene in the presence of aluminum chloride as catalyst, whereby substantial carbon t-butylation in the para position occurs.

4. The process for preparing a para-alkylated thiophenol in substantial yield by direct ring alkylation of an alkklatable thiophenol which comprises admixing one part by weight of an alkylatable thiophenol selected from the class consisting of thiophenol and ortho-lower alkyl-substituted thiophenols, from 0.75 to 1 part by weight of a monoolefinic hydrocarbon containing from 4 to 12 carbon atoms and in which the alkyl substituent formed is a tertiary alkyl group, and from 3 to 25 percent by weight, based on the thiophenol, of a catalyst selected from the class consisting of aluminum chloride, aluminum bromide, aluminum iodide, and zirconium tetrachloride, heating the admixture to a temperature within the range of 75–100° C. for one to three hours so that there occurs substantial substitution by the tertiary alkyl group in the para position of said thiophenol, and recovering the para-t-alkyl thiophenol from the mixture in substantial yield based on said thiophenol.

5. The process for preparing a para-alkylated thiophenol in substantial yield by direct ring alkylation of an alkylatable thiophenol which comprises admixing one part by weight of an alkylatable thiophenol selected from the class consisting of thiophenol and thiocresol containing between 10 and 100 percent by weight of o-thiocresol, from 0.75 to 1 part by weight of a monoolefinic hydrocarbon containing from 4 to 12 carbon atoms and in which the alkyl substituent formed is a tertiary alkyl group, and from 5 to 10 percent by weight of aluminum chloride based on the weight of said thiophenol, heating the admixture to a temperature within the range of 75–100° C. for one to three hours so that there occurs substantial substitution by the tertiary alkyl group in the para position of said thiophenol, and recovering the para-t-alkyl thiophenol from the mixture in substantial yield based on said thiophenol.

6. The process of substituting the hydrogen atom in the para position of a thiophenol by a tertiary alkyl group and obtaining substantially all C-alkylate product which comprises reacting a thiophenol containing hydrogen atoms in meta and para positions with a monoolefinic hydrocarbon containing from 4 to 12 carbon atoms and in which the alkyl substituent formed is a tertiary alkyl group, effecting said reaction in the presence of a catalyst selected from the class consisting of aluminum chloride, aluminum bromide, aluminum iodide, and zirconium tetrachloride so that the reaction product obtained includes substantial amounts of para-C-alkylate product in addition to S-alkylate, and reacting the S-alkylate product in the presence of said catalyst to form para-C-alkylate product.

7. The process of substituting the hydrogen atom in the para position of a thiophenol by a tertiary alkyl group and obtaining substantially all C-alkylate product which comprises reacting a thiophenol containing hydrogen atoms in meta and para positions with a monoolefinic hydrocarbon containing from 4 to 12 carbon atoms and in which the alkyl substituent formed is a tertiary alkyl group, effecting said reaction in the presence of a catalyst selected from the class consisting of aluminum chloride, aluminum bromide, aluminum iodide, and zirconium tetrachloride so that the reaction product obtained includes substantial amounts of para-C-alkylate product in addition to S-alkylate, and reacting the S-alkylate product and additional portions of said thiophenol in the presence of said catalyst to form para-C-alkylate product.

8. The process for t-butylating thiophenol to yield p-t-butylthiophenol which comprises reacting thiophenol with isobutylene in the presence of aluminum chloride as catalyst so that the reaction product obtained includes substantial amounts of p-t-butylthiophenol in addition to sulfide selected from the group consisting of t-butyl phenyl sulfide, t-butyl p-t-butylphenyl sulfide and mixtures thereof, and reacting said sulfide and thiophenol in the presence of aluminum chloride to form p-t-butylthiophenol.

9. The process for preparing para-alkyl thiophenols which comprises reacting a t-alkyl aryl sulfide in which the aryl radical contains hydrogen atoms in meta and para positions in the presence of a catalyst selected from the class consisting of aluminum chloride, aluminum bromide, aluminum iodide, and zirconium tetrachloride to produce substantial amounts of a para-C-alkylated thiophenol.

10. The process for preparing para-alkyl thiophenols which comprises reacting a t-alkyl para-alkaryl sulfide with a thiophenol containing hydrogen atoms in meta and para positions in the presence of a catalyst selected from the class consisting of aluminum chloride, aluminum bromide, aluminum iodide, and zirconium tetrachloride to produce substantial amounts of a para-C-alkylated thiophenol.

11. The process for preparing para-t-butylated thiophenols which comprises reacting a t-butyl aryl sulfide in which the aryl radical contains hydrogen atoms in meta and para positions in the presence of a catalyst selected from the class consisting of aluminum chloride, aluminum bromide, aluminum iodide, and zirconium tetrachloride to produce substantial amounts of a para-C-t-butylated thiophenol.

12. The process for preparing para-t-butylated thiophenols which comprises reacting a t-butyl aryl sulfide in which the aryl radical contains hydrogen atoms in meta and para positions with a thiophenol containing hydrogen atoms in meta and para positions in the presence of a catalyst selected from the class consisting of aluminum chloride, aluminum bromide, aluminum iodide, and zirconium tetrachloride to produce substantial amounts of a para-C-t-butylated thiophenol.

13. The process for preparing para-t-butylated thiophenols which comprises reacting t-butyl p-t-butylaryl sulfide and a thiophenol containing hydrogen atoms in meta and para positions in the presence of aluminum chloride as catalyst to produce substantial amounts of a p-t-butylthiophenol.

14. The process for preparing p-t-butylthiophenol from t-butyl phenyl sulfide which comprises reacting t-butyl phenyl sulfide in the presence of aluminum chloride as catalyst to produce substantial amounts of p-t-butylthiophenol.

15. The process for preparing 4-t-butyl-o-thiocresol which comprises admixing o-thiocresol, isobutylene, and aluminum chloride and heating the admixture under ring alkylating conditions so that substantial t-butylation in the para position occurs.

16. The process for preparing 4-t-butyl-2,6-thioxylenol which comprises admixing 2,6-thioxylenol, isobutylene and aluminum chloride and heating the admixture under ring alkylating conditions so that substantial t-butylation in the para position occurs.

17. The process for preparing p-t-butylthiophenol from t-butyl p-t-butylphenyl sulfide which comprises reacting t-butyl p-t-butylphenyl sulfide and thiophenol in the presence of aluminum chloride as catalyst to produce substantial amounts of p-t-butylthiophenol.

18. The process of substituting the hydrogen atom in the para position of a thiophenol by a tertiary alkyl group which comprises ring alkylating an alkylatable thiophenol containing hydrogen atoms in meta and para positions with a monoolefinic hydrocarbon alkylating agent, in which the alkyl substituent formed is a tertiary alkyl group, under ring alkylating conditions in the presence of a catalyst selected from the class consisting of aluminum chloride, aluminum bromide, aluminum iodide, and zirconium tetrachloride so that there occurs substantial substitution by the tertiary alkyl group in the para position.

19. The process for preparing para-alkyl thiophenols which comprises alkylating an alkylatable thiophenol containing hydrogen atoms in meta and para positions with a monoolefinic hydrocarbon containing from 4 to 12 carbon atoms, and in which the alkyl substituent formed is a tertiary alkyl group, under ring alkylating conditions in the presence of a catalyst selected from the class consisting of aluminum chloride, aluminum bromide, aluminum iodide, and zirconium tetrachloride so that there occurs substantial substitution by the tertiary alkyl group in the para position.

20. The process for preparing para-alkyl thiophenols which comprises alkylating a thiophenol selected from the class consisting of thiophenol and ortho-lower alkyl-substituted thiophenols with a monoolefinic hydrocarbon containing from 4 to 12 carbon atoms, and in which the alkyl substituent formed is a tertiary alkyl group, under ring alkylating conditions in the presence of a catalyst selected from the class consisting of aluminum chloride, aluminum bromide, aluminum iodide, and zirconium tetrachloride so that there occurs substantial substitution by the tertiary alkyl group in the para position.

21. The process according to claim 20 wherein said catalyst is aluminum chloride.

References Cited in the file of this patent

UNITED STATES PATENTS

| 2,686,815 | Nickels | Aug. 17, 1954 |
|---|---|---|
| 2,739,172 | Peters | Mar. 20, 1956 |
| 2,800,451 | Mottern | July 23, 1957 |

UNITED STATES PATENT OFFICE
CERTIFICATE OF CORRECTION

Patent No. 3,084,196                                  April 2, 1963

Robert J. Laufer

It is hereby certified that error appears in the above numbered patent requiring correction and that the said Letters Patent should read as corrected below.

Column 2, line 69, for "o-chlorthiophenol" read -- o-chlorothiophenol --; column 3, line 19, after "propylene" strike out the comma; line 43, after "sulfate" strike out the period; line 44, after "($AlCl_2HSO_4$)" insert a comma; column 8, line 8, for "$ZrCl_3$)" read -- $ZrCl_4$) --; column 12, line 26, for "t-tolyl" read -- t-butyl tolyl --; line 57, for "sulfite" read -- sulfide --; same column 12, line 71, for "temhniques" read -- techniques --.

Signed and sealed this 5th day of November 1963.

(SEAL)
Attest:

ERNEST W. SWIDER
Attesting Officer

EDWIN L. REYNOLDS

Acting Commissioner of Patents